Oct. 29, 1935.   T. A. RICH   2,019,318
DEMAND METER
Filed Nov. 1, 1934
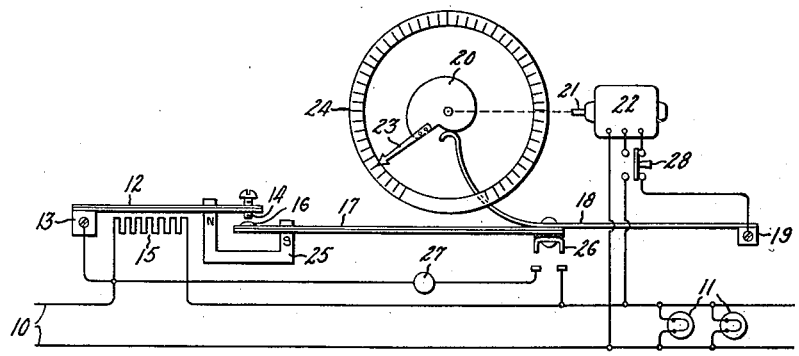
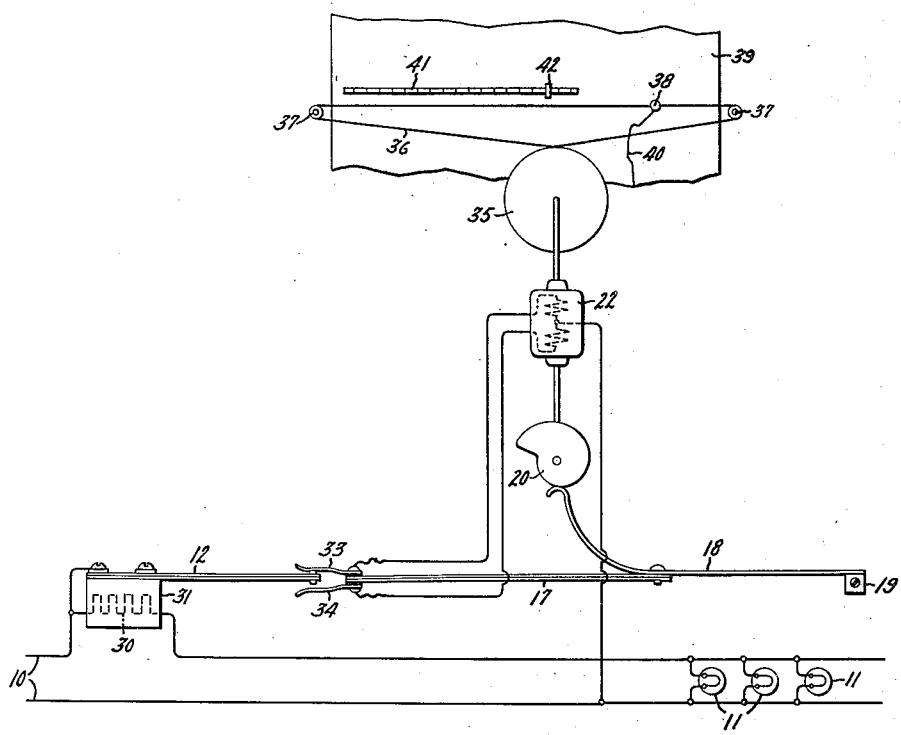
Inventor:
Theodore A. Rich,
by Harry E. Dunham
His Attorney.

Patented Oct. 29, 1935

2,019,318

UNITED STATES PATENT OFFICE 2,019,318

DEMAND METER

Theodore A. Rich, Schenectady, N. Y., assignor to General Electric Company, a corporation of New York Application November 1, 1934, Serial No. 750,931

7 Claims. (Cl. 171—34)

My invention relates to demand responsive devices and in particular to thermal demand responsive devices, such as meters and control devices.

An important object of my invention is to provide a reliable accurate demand meter of low cost. For example, the demand meter of my invention does not require the use of friction pointers, jewel bearings, clutches or gearing. Another object of my invention is to provide a demand meter having a long uniform scale. Another object of the invention is to provide a demand responsive device, the moving element of which has ample torque for operating rugged recording apparatus control contacts, etc. In carrying my invention into effect, I prefer to make use of a contact making thermostat compensated for ambient temperatures and responsive to the heating effect of the load current in the electric circuit, the demand of which is being measured. The movement of the thermostat is then used to control an electric motor which not only operates the demand pointer, recording pen or control contacts as desired, but also produces a follow up control on the thermostat operated contacts to change their setting so as to stop the motor until a higher demand is reached.

The features of my invention which are believed to be novel and patentable will be pointed out in the claims appended hereto.

For a better understanding of my invention, reference is made in the following description to the accompanying drawing, Fig. 1 of which represents a maximum demand meter which gives an indication of the maximum demand reached since some previous manual resetting operation of the meter, and Fig. 2 represents a recording maximum demand meter arranged to produce a continuous record of the demand measurement obtained.

Referring now to Fig. 1, 10 represents an electric supply source, either direct or alternating current, supplying load devices indicated at 11 through the intermediate circuit. The demand meter of my invention is arranged to measure and indicate the maximum demand of such circuit. The demand meter illustrated employs a bimetallic strip 12 secured at one end to a copper supporting block 13 and having a contact 14 at its free end. The strip is heated by an electric heater unit represented at 15 which is included in the load circuit and is therefore responsive to the load current. The arrangement is such that the strip 12 bends its contact end 14 downward with an increase in temperature. Contact 14 cooperates with a relatively movable contact 16 located on the free end of a resiliently supported conducting member which preferably includes a bimetallic strip 17 to compensate the meter for changes in ambient temperatures. Bimetallic strip 17 is thus arranged to bend downward with a rise in temperature but is suitably screened from heater 15 so as to be subject to ambient temperatures only. Consequently, there will be no relative change in the position of the two contacts 14 and 16 with ambient temperature changes, as both will be equally influenced by such changes. Bimetallic strip 17 is secured to a resilient arm 18 rigidly supported at 19 and having the other end bent upward to rest against a cam 20. Cam 20 is mounted on the shaft 21 of a slow speed motor 22, and the circuit of motor 22 is controlled by contacts 14 and 16 so that the motor is energized only when these contacts are closed. A demand pointer 23 is also rotated with cam 20 and cooperates with a demand scale 24 which may extend over an arc of nearly 360 degrees. When the motor is energized, it slowly turns the cam 20 and pointer 23 in a clockwise direction moving the pointer up scale. The cam 20 simultaneously moves resilient support 18 downward and with it bimetallic strip 17 and contact 16, until the motor circuit at contacts 14 and 16 is opened. The sensitivity of the thermal responsive device with respect to controlling the motor 22 is thus decreased so that it will not again close the motor circuit until a greater demand occurs. The apparatus will be initially adjusted so that with no heating current through resistor 15, contacts 14 and 16 will just be open when the resilient member 18 is resting on the low end of cam 20. At this time pointer 23 will be at the zero end of scale 24. If now a low value of current flows through resistor 15, strip 12 will be heated thereby and bent to close contacts 14 and 16 which energizes the motor 22. The motor will then start turning cam 20 in a clockwise direction and forcing contact 16 downward until the motor circuit is opened. The contacts 14 and 16 will not be closed again until some higher value of current is passed through heater unit 15, but when this occurs, the motor will again be started to rotate cam 20 farther and to further depress contact 16 and move pointer 23 up scale, until the motor circuit is again opened with the members 18, 20 and 23 in positions corresponding to the maximum deflection of strip 12 caused by heat from unit 15. The pointer 23 will thus indicate the maximum ampere demand of the electric load circuit since the pointer 23 was reset to zero. The deflection of strip 12 follows the square law, but the scale 24 may be made uniform or of any other desired character by properly shaping the cam 20. The time lag of strip 12 may be suitably adjusted by giving the copper block 13 more or less heat storage capacity and more or less insulating this part against heat transfer, so that the demand will substantially represent that corresponding to an appreciable interval of time, as for example fifteen minutes. For example, the heat storage and heat insulating factors of strips 12 and block 13 may be made such that with a given current in heater 15, it requires about fifteen minutes for strips 12 to reach a constant temperature corresponding to such current. Also the heater unit may be arranged to produce heat proportional to other characteristics of the load circuit, as for example, watts as taught for example in United States Patent 1,156,412, October 12, 1915 to Paul M. Lincoln. The motor 22 will have a slow speed, for example, not greater than about one revolution per minute so as to faithfully follow the thermal element. A constant speed motor is not required.

In order to prevent unnecessary sparking between contacts 14 and 16, it may be desirable to give these contacts a slight snap action when opening and closing, and for this purpose, I have added a small permanent magnet 25 adjacent thereto but out of contact with the strip 12 and 17 to produce a small amount of flux between the two strips. The strips have at least one element thereof made of magnetic material. The slight magnetic attraction between the free ends of the two strips will then aid in quickly opening and closing the contacts as they are biased away from and towards each other by movements due to temperature variations.

I have also provided a switch part 26 on some part of the apparatus moved by the motor 22 arranged to short circuit the heater unit 15 in case of an overload beyond the range of the meter, and in this short circuiting circuit I have represented a device 27 which may be an alarm or load control relay that comes into action upon the occurrence of a predetermined overload.

It will be evident that the demand meter described has certain desirable features, as for example, there is no gearing, clutches, friction pointers or jeweled bearings, necessary. The scale and pointer may be as large as desired, as the motor torque may be made anything desired. The scale may have a uniform calibration or otherwise, depending upon the shape of the cam employed. The motor may be used to operate switches and other devices directly, and it is energized only a very small part of the time. For example, if the meter is reset once per month and the motor when in operation operates at a rate of one revolution per minute, the maximum aggregate time during which the motor would be energized would be about one minute during the month, although it may start and stop several times. The pointer and cam 23 may be reset towards a zero position by hand or by momentarily reversing the motor by a switch 28.

In Fig. 2, I have represented a recording demand meter embodying my invention. The parts which are similar to those previously described are represented by like reference characters. The heating unit 30 for bimetallic strip 12 is represented as being embedded in a massive supporting block 31 on which the strip 12 is mounted. This gives a desirable time lag averaging effect between the instantaneous values of current in unit 30 and the response of strip 12. The two bimetallic strips are provided with double contacts 33 and 34 arranged to reverse the motor 22 which operates the cam 20 and positions the resilient support 18 for arm 17, such that the cam 20 will not remain in the position of maximum demand, but will move in opposite directions as the demand varies up and down, and will thus always assume a position corresponding to the demand that has just been measured.

To the shaft of motor 22 is secured a drum 35 about which is wrapped a belt 36. The belt is then stretched between two pulleys 37 and has on it between the pulleys 37 a recording stylus 38 which draws a record of its position on a moving record chart 39. It will be evident that the transverse position of stylus 38 with respect to chart 39 corresponds to the demand measurement and the line 40 drawn on the chart is a record of such measurement. The stylus 38 may cooperate with a scale 41 to indicate the demand measurement, and this scale may be provided with a slider 42 which will be moved to the left by stylus 38 as the demand measurement increases. Slider 42 will thus serve to give an indication of the maximum demand measured without the necessity of searching the record therefor.

I have herein shown and particularly described certain embodiments of my invention and certain methods of operation embraced therein for the purpose of explaining its principle and showing its application, but it will be obvious to those skilled in the art that many modifications and variations are possible, and I aim, therefore, to cover all such modifications and variations as fall within the scope of my invention which is defined in the appended claims.

What I claim as new and desire to secure by Letters Patent of the United States is:

1. A demand meter comprising an electric motor, a thermal responsive device heated in response to the demand to be measured, control means operated by the thermal responsive device in response to a rise in temperature thereof for energizing said electric motor, means operated by said electric motor when thus energized for decreasing the sensitivity of said thermal responsive means on such controlling operation, whereby the motor is deenergized until a greater demand occurs, and means operated by said motor for indicating the maximum demand.

2. A demand meter comprising an electric motor, a thermal responsive device compensated for changes in ambient temperature and heated in response to the demand to be measured, control means operated by the thermal responsive device in response to a change in demand for energizing said electric motor, means operated by said motor when thus energized for changing the setting of said control means in such manner that the motor is deenergized until another change in demand occurs, and means operated by said motor for indicating the demand measurement.

3. A thermal demand meter comprising a bimetallic strip supported at one end and having a contact at the opposite end thereof, an electric heater for heating said strip, a second bimetallic strip movably supported at one end and having a contact at its opposite end positioned to be engaged by said first mentioned contact when the first bimetallic strip is heated, said strips being arranged so as to produce no relative movement between said contacts in response to ambient temperature changes, an electric motor which is energized and deenergized by the closing and opening of said contacts, cam means operated by said motor for moving the support of the second bimetallic strip in a direction to separate said contacts, and means for indicating the position of said cam in terms of maximum demand.

4. A thermal demand meter comprising a pair of bimetallic strips each supported at one end and having free ends adjacent each other to form relatively movable contacts of a switch, said strips being arranged so that ambient temperature changes produce no relative movement between the free ends of said strip, an electric heater for one of said strips which, when energized, causes a bending of its strip in a direction to close said contacts, an electric motor which is energized and deenergized by the closing and opening of said switch, a cam rotated by said motor, means operated by said cam for moving the support of one of said bimetallic strips in a direction to open said contacts and stop the motor, whereby the contacts will not again be closed until there has occurred a greater energization of said electric heater, a pointer rotated with said cam and a scale cooperating with said pointer to indicate the maximum rotation of said cam in terms of maximum demand.

5. A demand meter comprising a slow speed electric motor, a cam driven by said motor having a progressively increasing radius over nearly 360 degrees of its periphery, a thermostat device compensated for ambient temperature changes and thermally responsive to heat energy of an electric circuit, the demand of which is to be measured for energizing said electric motor when the demand increases, means moved by said cam for adjusting the setting of said thermostat device to deenergize said motor, whereby the motor will not again be energized until some progressively greater demand occurs, said operations continuing with progressively increasing demands until said cam has made substantially a complete revolution, and means for indicating the position of said cam in terms of maximum demand.

6. A thermal responsive demand measuring device comprising a slow speed electric motor, a thermostat device compensated for ambient temperature changes, an electric heater for said thermostat energized in response to the demand to be measured, said thermostat serving to energize said electric motor upon an increase in demand, means operated by said motor when thus energized for progressively decreasing the sensitivity of the control of said thermostat device upon each increase in demand such that the motor is again deenergized until some greater demand occurs, and means operated by motor for short circuiting said electric heater, as the demand measuring limit of said device is approached.

7. A thermal responsive demand meter comprising a reversible slow speed electric motor, a thermostat device compensated for ambient temperature changes and responsive to increases and decreases in the demand to be measured for energizing said motor for opposite direction of operation, means operated by said electric motor for changing the setting of said thermostat control device in a direction to deenergize said motor, and demand measurement means operated by said electric motor.

THEODORE A. RICH.